United States Patent
Smejtek (10) Patent No.: US 12,518,894 B2
(45) Date of Patent: Jan. 6, 2026

(54) ELECTRICAL CABLE WITH DIELECTRIC FILM

(71) Applicant: Swift Bridge Technologies (M) Sdn Bhd, Penang (MY)

(72) Inventor: Dalibor Jan Smejtek, Portland, OR (US)

(73) Assignee: Swift Bridge Technologies (M) Sdn Bhd, Panang (MY)

( * ) Notice: Subject to any disclaimer, the term of this patent is extended or adjusted under 35 U.S.C. 154(b) by 576 days.

(21) Appl. No.: 18/145,018

(22) Filed: Dec. 22, 2022

(65) Prior Publication Data

US 2023/0215603 A1 Jul. 6, 2023

Related U.S. Application Data

(60) Provisional application No. 63/295,659, filed on Dec. 31, 2021.

(51) Int. Cl.
| | | |
|---|---|---|
| *H01B 11/18* | (2006.01) | |
| *H01B 13/016* | (2006.01) | |
| *H01B 3/00* | (2006.01) | |
| *H01B 3/16* | (2006.01) | |
| *H01B 3/30* | (2006.01) | |

(52) U.S. Cl.
CPC ..... *H01B 11/1847* (2013.01); *H01B 11/1834* (2013.01); *H01B 11/1843* (2013.01); *H01B 13/0165* (2013.01); *H01B 13/0167* (2013.01); *H01B 3/002* (2013.01); *H01B 3/16* (2013.01); *H01B 3/307* (2013.01)

(58) Field of Classification Search
None
See application file for complete search history.

(56) References Cited

U.S. PATENT DOCUMENTS

| | | |
|---|---|---|
| 3,033,727 A | 5/1962 | Cram et al. |
| 3,769,085 A | 10/1973 | Matsurbara |
| 3,928,705 A | 12/1975 | Loft et al. |
| 4,271,226 A | 6/1981 | Herbreteau |
| 4,529,564 A | 7/1985 | Harlow |
| 4,533,417 A | 8/1985 | Puckowski et al. |

(Continued)

FOREIGN PATENT DOCUMENTS

EP 2254126 A1 11/2010

OTHER PUBLICATIONS

Anderson, Mike, "The Benefits of Low Capacitance and Coaxial Cable", ATL Technology, posted Apr. 17, 2018, https://atltechnology.com/blog/benefits-low-capacitance-and-coaxial-cable/, 3 pages.

(Continued)

*Primary Examiner* — Krystal Robinson
(74) *Attorney, Agent, or Firm* — Barta Jones PLLC (57) ABSTRACT

A cable includes an inner conductor and a dielectric layer extending around the inner conductor. The dielectric layer includes a linearly-stretched polypropylene film having a porous structure that includes a plurality of pores that extend through a thickness of the linearly-stretched polypropylene film. The dielectric layer includes air molecules trapped within the pores of the linearly-stretched polypropylene film such that the dielectric layer includes polypropylene and air. The cable includes an outer conductor extending around the dielectric layer.

20 Claims, 6 Drawing Sheets

(56) References Cited

U.S. PATENT DOCUMENTS

| | | | |
|---|---|---|---|
| 4,598,011 | A | 7/1986 | Bowman |
| 4,629,925 | A | 12/1986 | Booth et al. |
| 4,866,212 | A | 9/1989 | Ingram |
| 6,824,680 | B2 | 11/2004 | Chandavasu et al. |
| 2009/0114415 | A1* | 5/2009 | Morijiri ............... H01B 11/203 174/103 |
| 2015/0047872 | A1 | 2/2015 | Mori |
| 2017/0062096 | A1* | 3/2017 | Koeppendoerfer ......................... H01B 11/1839 |
| 2018/0174076 | A1 | 6/2018 | Fukami |
| 2018/0174706 | A1* | 6/2018 | Shimosawa .............. H01B 7/18 |
| 2023/0099568 | A1* | 3/2023 | Nishi ..................... H01B 13/06 174/120 R |

OTHER PUBLICATIONS

Unknown, "Gore Spaceflight Microwave Cable Assemblies", W. L. Gore & Associates, Inc., copyright 2003, 67 pages.

Thomas, Shane, "International Search Report & Written Opinion", International Application No. PCT/US22/82615, mailed Mar. 27, 2023, 9 pages.

\* cited by examiner

ELECTRICAL CABLE WITH DIELECTRIC FILM

BACKGROUND

Electrical cables include a dielectric layer that extends radially between inner conductor(s) and an outer conductor to electrically insulate the inner and outer conductors from each other. The dielectric layer is typically configured with as low as possible of a dielectric constant to maximize the velocity of signal propagation through the electrical cable.

SUMMARY

In one aspect, a cable includes an inner conductor and a dielectric layer extending around the inner conductor. The dielectric layer includes a linearly-stretched polypropylene film having a porous structure that includes a plurality of pores that extend through a thickness of the linearly-stretched polypropylene film. The dielectric layer includes air molecules trapped within the pores of the linearly-stretched polypropylene film such that the dielectric layer includes polypropylene and air. The cable includes an outer conductor extending around the dielectric layer.

In another aspect, a cable includes at least one inner conductor and a dielectric layer extending around the at least one inner conductor. The dielectric layer includes a linearly-stretched polypropylene film having a porous structure that includes a plurality of pores that extend through a thickness of the linearly-stretched polypropylene film. The dielectric layer includes air molecules trapped within the pores of the linearly-stretched polypropylene film such that the dielectric layer includes polypropylene and air. The linearly-stretched polypropylene film is cross-linked. An outer conductor extends around the dielectric layer. The cable includes a jacket extending around the outer conductor.

In another aspect, a method for assembling a coaxial cable includes applying a linearly-stretched polypropylene film around an inner conductor of the coaxial cable to form a dielectric layer around the inner conductor. The linearly-stretched polypropylene film has a porous structure that includes a plurality of pores that extend through a thickness of the linearly-stretched polypropylene film. The method includes applying an outer conductor around the linearly-stretched polypropylene film of the dielectric layer such that air molecules are trapped within the pores of the linearly-stretched polypropylene film.

DETAILED DESCRIPTION

The foregoing summary, as well as the following detailed description of certain implementations will be better understood when read in conjunction with the appended drawings. While various spatial and directional terms, such as "top," "bottom," "upper," "lower," "vertical," and the like are used to describe implementations of the present application, it is understood that such terms are merely used with respect to the orientations shown in the drawings. The orientations can be inverted, rotated, or otherwise changed, such that a top side becomes a bottom side if the structure is flipped 180°, becomes a left side or a right side if the structure is pivoted 90°, etc.

To reduce the dielectric constant $\varepsilon_r$ and thereby increase the signal propagation speeds of electrical cables, different types of polymeric materials have been enhanced with air utilizing different manufacturing processes. Foaming of polyethylene and fluoropolymers (e.g., polytetrafluoroethylene (PTFE), etc.) about the inner conductor(s) has been successful in producing electrical cables with lower dielectric constants $\varepsilon_r$. For example, air-enhanced PTFE films helically wrapped around the inner conductor(s) have yielded dielectric materials with dielectric constants $\varepsilon_r$ of approximately 1.4.

Linearly-stretched polypropylene films are known for use as battery separator material within lithium ion batteries. However, linearly-stretched polypropylene films are temperature sensitive such that the porosity of the linearly-stretched polypropylene film decreases as the temperature is elevated at or near the glass transition temperature of the linearly-stretched polypropylene film. Known methods for constructing electrical cables have focused on other dielectric materials having lower temperature sensitivities, such as polyethylene, PTFE, expanded PTFE (ePTFE), and other expanded and/or foamed fluoropolymers.

Certain implementations provide a cable including an inner conductor and a dielectric layer extending around the inner conductor. The dielectric layer includes a linearly-stretched polypropylene film having a porous structure that includes a plurality of pores that extend through a thickness of the linearly-stretched polypropylene film. The dielectric layer includes air molecules trapped within the pores of the linearly-stretched polypropylene film such that the dielectric layer includes polypropylene and air. The cable includes an outer conductor extending around the dielectric layer.

Certain implementations provide a method for assembling a coaxial cable. The method includes applying a linearly-stretched polypropylene film around an inner conductor of the coaxial cable to form a dielectric layer around the inner conductor. The linearly-stretched polypropylene film has a porous structure that includes a plurality of pores that extend through a thickness of the linearly-stretched polypropylene film. The method includes applying an outer conductor around the linearly-stretched polypropylene film of the dielectric layer such that air molecules are trapped within the pores of the linearly-stretched polypropylene film.

Certain implementations provide linearly-stretched polypropylene films that operate in an unconventional manner to provide dielectric layers that have a greater porosity and therefore a lower dielectric constant $\varepsilon_r$ (e.g., as compared to at least some known dielectric layers, as compared to polyethylene, as compared to PTFE, as compared to an expanded and/or foamed fluoropolymer, etc.), while maintaining the mechanical properties (e.g., the structural integrity, etc.) that enable the dielectric layer to physically space the inner and outer conductors radially apart from each other. Certain implementations enable the cables disclosed herein to achieve greater signal propagation speeds that result in improved signal propagation characteristics, while maintaining a relatively high flexibility and less distortion of the signal with bending (e.g., as compared to at least some known electrical cables, etc.).

Certain implementations cross-link a linearly-stretched polypropylene film to decrease the temperature sensitivity (i.e., increase the heat resistance) of the linearly-stretched polypropylene film. Cross-linking of the linearly-stretched polypropylene film enables the dielectric layer and thereby the electrical cable to withstand higher temperatures.

Figure 1:
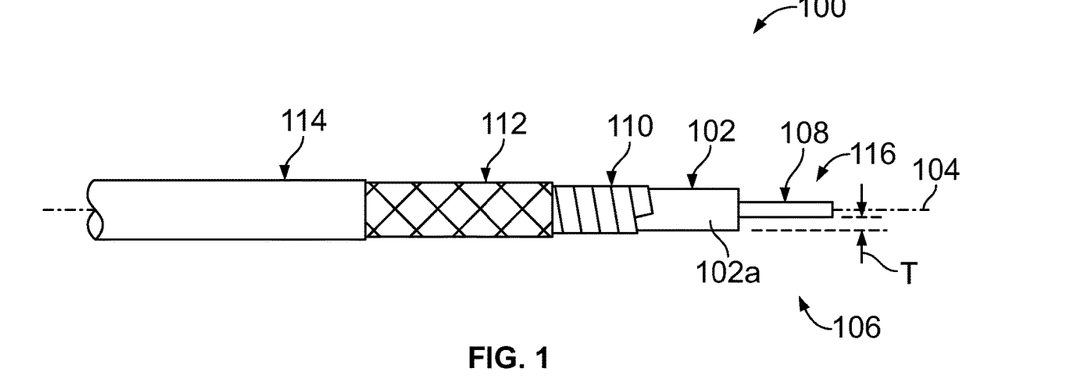
FIG. 1 is a partially broken-away elevational view of an electrical cable according to an implementation.
Figure 2:
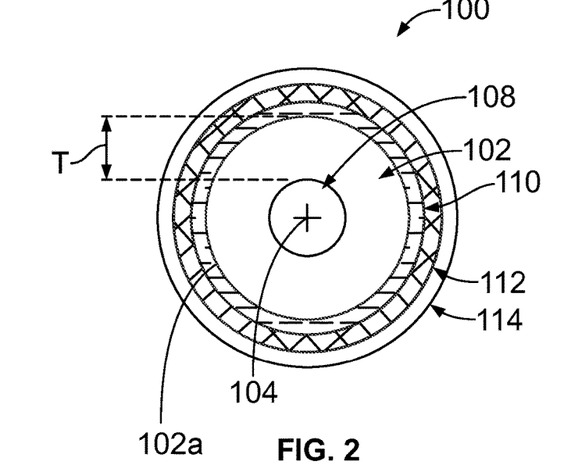
FIG. 2 is a cross-sectional view of the electrical cable shown in FIG. 1 according to an implementation.

With references now to the figures, elevational and cross-sectional views of an electrical cable 100 are provided in FIGS. 1 and 2, respectively. The electrical cable 100 includes a dielectric layer 102 that includes a linearly-stretched polypropylene film 102*a* having a porous structure that includes a plurality of pores that extend through a thickness T of the linearly-stretched polypropylene film 102*a*. As will be described below, air molecules are trapped within the porous structure of the linearly-stretched polypropylene film 102*a* such that the linearly-stretched polypropylene film 102*a*, and thus the dielectric layer 102, includes both polypropylene and air (i.e., includes polypropylene and includes air).

The electrical cable 100 extends a length along a longitudinal axis 104 from an end portion 106 to an opposite end portion (not shown). In the exemplary implementation shown in FIGS. 1 and 2, the electrical cable 100 an inner conductor 108, the dielectric layer 102, an outer conductor 110, an outer shield 112, and a jacket 114. As best seen in FIG. 1, the inner conductor 108 extends a length along the longitudinal axis 104 from an end portion 116 to an opposite end portion (not shown). The dielectric layer 102 extends around the inner conductor 108 and the outer conductor 110 extends around the dielectric layer 102. The outer shield 112 extends around the outer conductor 110 and the jacket 114 extends around the outer shield 112. Beginning at the end portion 106 of the electrical cable 100, portions of the dielectric layer 102, the outer conductor 110, the outer shield 112, and the jacket 114 have been progressively removed from Figure to illustrate the construction of the electrical cable 100 more clearly.

The dielectric layer 102 extends radially (relative to the longitudinal axis 104) between the inner conductor 108 and the outer conductor 110 such that the dielectric layer 102 electrically insulates the inner conductor 108 from the outer conductor 110. For example, the linearly-stretched polypropylene film 102*a* of the dielectric layer 102 is a dielectric material that has a relatively low dielectric constant (e.g., less than approximately 1.7, less than approximately 1.4, etc.) that enables the linearly-stretched polypropylene film 102*a*, and thus the dielectric layer 102, to electrically insulate the inner and outer conductors 108 and 110, respectively, from each other.

In some implementations, the dielectric layer 102 includes two or more sub-layers of the linearly-stretched polypropylene film 102*a*. The dielectric layer 102 may include any number of sub-layers of the linearly-stretched polypropylene film 102*a*. In one exemplary implementation, the dielectric layer 102 includes one sub-layer of the linearly-stretched polypropylene film 102*a* (e.g., the dielectric layer 202 shown in FIG. 3, etc.).

Each sub-layer of the linearly-stretched polypropylene film 102*a* may be applied around the inner conductor 108 (or any intervening sub-layers of the linearly-stretched polypropylene film 102*a*) in any arrangement, configuration, manner, with any geometry, and/or the like that enables the dielectric layer 102 to function as described and/or illustrated herein (e.g., to electrically insulate the conductors 108 and 110 from each other, to provide a dielectric constant of less than approximately 1.7, etc.). For example, sub-layers of the linearly-stretched polypropylene film 102*a* may be: axially-wrapped around the inner conductor 108; helically-wrapped around the inner conductor 108; fabricated as a tube, sheath, and/or the like (e.g., via extrusion, etc.); and/or the like.

When wrapped around the inner conductor 108 (or an intervening sub-layer of the linearly-stretched polypropylene film 102*a*), the winding turns of a sub-layer of the linearly-stretched polypropylene film 102*a* may have any lay angle, any winding direction, any amount of overlap of adjacent winding turns, any amount of spacing between adjacent winding turns, and/or the like that enables the dielectric layer 102 to function as described and/or illustrated herein (e.g., to electrically insulate the conductors 108 and 110 from each other, to provide a dielectric constant of less than approximately 1.7, to provide a dielectric constant of less than approximately 1.4, etc.). In some implementations, the dielectric layer 102 includes two or more sub-layers of the linearly-stretched polypropylene film 102*a* that are wrapped with different lay angles, different winding directions, different overlaps, different spacings, and/or the like as compared to each other.

Figure 3:
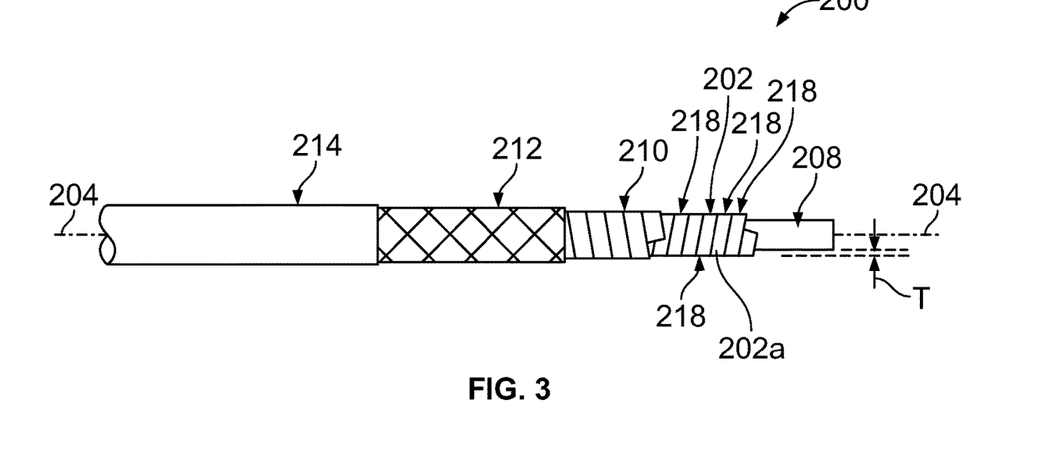
FIG. 3 is a partially broken-away elevational view of an electrical cable according to an implementation.

In one exemplary implementation, the dielectric layer 102 includes one sub-layer of the linearly-stretched polypropylene film 102*a* that is helically-wrapped around the inner conductor 108. For example, FIG. 3 illustrates an electrical cable 200 that includes a dielectric layer 202 having a linearly-stretched polypropylene film 202*a*. The linearly-stretched polypropylene film 202*a* has a porous structure that includes a plurality of pores that extend through a thickness T of the linearly-stretched polypropylene film 202*a*. Air molecules are trapped within the porous structure of the linearly-stretched polypropylene film 202*a* such that the linearly-stretched polypropylene film 202*a*, and thus the dielectric layer 202, includes polypropylene and air (i.e., includes polypropylene and includes air).

The electrical cable 200 extends a length along a longitudinal axis 204 and includes an inner conductor 208, the dielectric layer 202, an outer conductor 210, an outer shield 212, and a jacket 214. As shown in FIG. 3, the dielectric layer 202 includes one sub-layer of the linearly-stretched polypropylene film 202*a*. The one sub-layer of the linearly-stretched polypropylene film 202*a* is wrapped in a helical configuration around a periphery of the inner conductor 208.

In other words, the one sub-layer of the linearly-stretched polypropylene film 202a is helically-wrapped around the inner conductor 208. For example, the one sub-layer of the linearly-stretched polypropylene film 202a is wound into winding turns 218 that extend along helical paths around the periphery of the inner conductor 208. In the exemplary implementation shown in FIG. 3, adjacent winding turns 218 of the linearly-stretched polypropylene film 202a overlap each other.

Referring again to FIGS. 1 and 2, another example of the dielectric layer 102 includes: a sub-layer of the linearly-stretched polypropylene film 102a that is helically-wrapped around the inner conductor 108; and a sub-layer of the linearly-stretched polypropylene film 102a that is axially-wrapped around the inner conductor 108. In another example, the dielectric layer 102 includes: a sub-layer of the linearly-stretched polypropylene film 102a that is helically-wrapped around the inner conductor 108; and a sub-layer of the linearly-stretched polypropylene film 102a that is fabricated as a tube, sheath, and/or the like. In yet another example, the dielectric layer 102 includes: a sub-layer of the linearly-stretched polypropylene film 102a that is axially-wrapped around the inner conductor 108; and a sub-layer of the linearly-stretched polypropylene film 102a that is fabricated as a tube, sheath, and/or the like. In still another example, the dielectric layer 102 includes: a sub-layer of the linearly-stretched polypropylene film 102a that is axially-wrapped around the inner conductor 108; a sub-layer of the linearly-stretched polypropylene film 102a that is helically-wrapped around the inner conductor 108; and a sub-layer of the linearly-stretched polypropylene film 102a that is fabricated as a tube, sheath, and/or the like. Another example of the dielectric layer 102 includes two sub-layers of the linearly-stretched polypropylene film 102a that are each helically-wrapped around the inner conductor 108.

Figure 4:
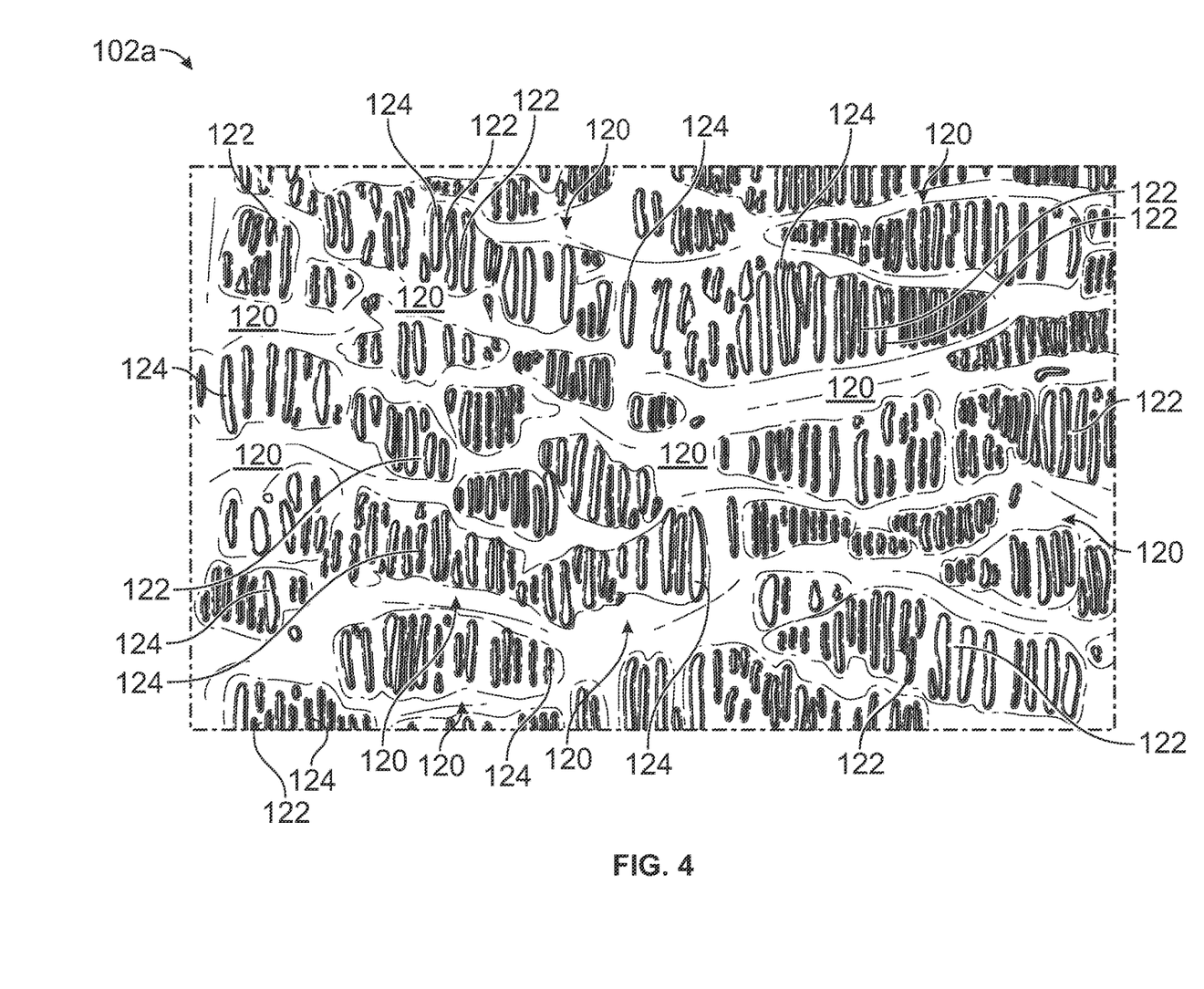
FIG. 4 is an illustration of an example of a microstructure of a linearly-stretched polypropylene film according to an implementation.

The linearly-stretched polypropylene film 102a (e.g., each sub-layer thereof) is a material that is formed by stretching a polypropylene film (e.g., a hard-elastic film, etc.) linearly (i.e., uniaxially). In other words, the linearly-stretched polypropylene film 102a (e.g., each sub-layer thereof) is a material that is formed by stretching a polypropylene film along only one axis (i.e. along only one direction), for example stretched along the x-axis but not the y-axis, stretched along the y-axis but not the x-axis, etc. The linearly-stretched polypropylene film 102a is a microporous membrane having a uniaxial (i.e., linear) microstructure that includes lamellar clusters, fibrillar crystals, and a plurality of pores. FIG. 4 illustrates one example of a microstructure of the linearly-stretched polypropylene film 102a. The uniaxial (i.e., linear) stretching-induced microstructure shown in FIG. 4 of the linearly-stretched polypropylene film 102a includes lamellar clusters 120, fibrillar crystals 122, and pores 124.

Figure 5:
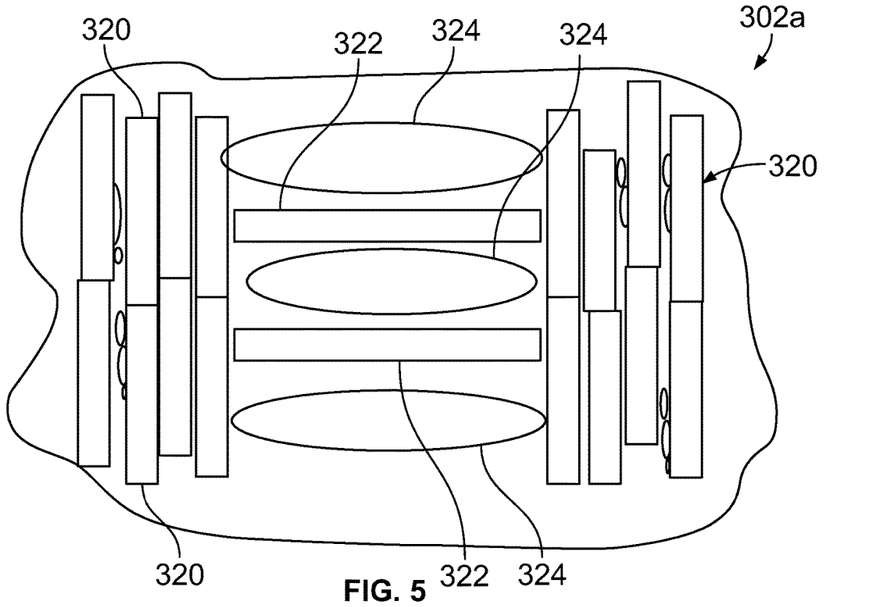
FIG. 5 is an illustration of an example of a microstructure of a linearly-stretched polypropylene film according to an implementation.
Figure 6:
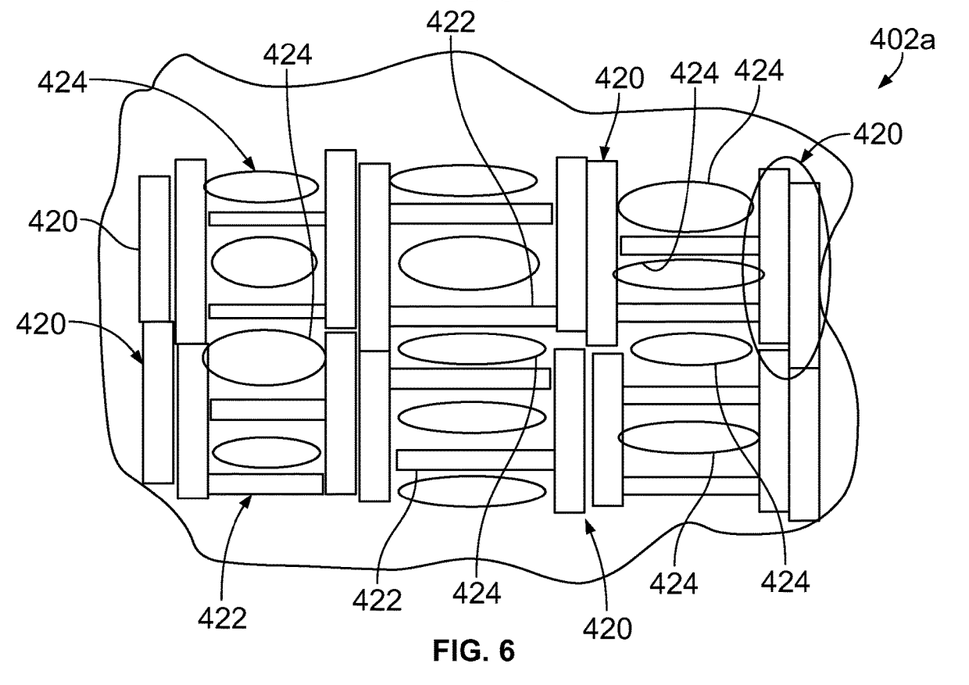
FIG. 6 is an illustration of an example of a microstructure of a linearly-stretched polypropylene film according to an implementation.

FIGS. 5 and 6 illustrate further examples of microstructures of the linearly-stretched polypropylene film 102a. Specifically, FIGS. 5 and 6 illustrate respective linearly-stretched polypropylene films 302a and 402a having microstructures that include lamellar clusters 320 and 420, fibrillar crystals 322 and 422, and pores 324 and 424, respectively.

The parameters at which the polypropylene film is linearly-stretched may affect the configuration (e.g., the size, shape, quantity, pattern, etc.) of the pores in the resulting linearly-stretched polypropylene film. For example, the temperature at which the linearly-stretching operation is performed on the polypropylene film may affect the configuration of the pores of the resulting linearly-stretched polypropylene film. The configuration of the pores may affect the dielectric constant (i.e., the relative permittivity) $\varepsilon_r$ of the resulting linearly-stretched polypropylene film. For example, the configuration of the pores may affect the volume of air held within the pores of the linearly-stretched polypropylene film (e.g., the porosity of the film, etc.). In one example, a greater volume of air held by a linearly-stretched polypropylene film provides the linearly-stretched polypropylene film with a lower dielectric constant $\varepsilon_r$ (i.e., dielectric constant $\varepsilon_r$ that is closer to 1.0). Accordingly, in some implementations, the temperature at which a polypropylene film is linearly stretched to produce the linearly-stretched polypropylene films disclosed herein (e.g., the linearly-stretched polypropylene films 102a, 202a, 302a, 402a, 502a, 602a, 702a, 802a, 902a, and 1002a shown in FIGS. 1, 2, 4, 3, and 5-12, respectively, etc.) is selected to increase (e.g., maximize, increase to below a level at which the film loses mechanical structural integrity, etc.) the volume air that the resulting linearly-stretched polypropylene film is capable of holding. In some implementations, a polypropylene film is linearly stretched at two or more different temperatures to produce the linearly stretched polypropylene film 102a.

Examples of temperatures at which at a polypropylene film may be linearly stretched to produce the linearly-stretched polypropylene films disclosed herein include, but are not limited to, approximately 105° C., approximately 145° C., approximately 250° C., approximately 270° C., and/or the like. Moreover, linear stretching of a polypropylene film to produce the linearly-stretched polypropylene films disclosed herein may include cold stretching (e.g., stretching at a temperature that is less than the temperature at which melting of the polypropylene film begins when the polypropylene film is uniformly heated from approximately room temperature at rate of approximately 20° C. per minute, etc.) and/or hot stretching (e.g., stretching at a temperature that is greater than the temperature at which melting of the polypropylene film begins, when the polypropylene film is uniformly heated from approximately room temperature at rate of approximately 20° C. per minute, but is less than the normal melting point of the polypropylene film, etc.).

One example of how the temperature at which a linear stretching operation is performed can affect the configuration of the pores in the resulting linearly-stretched polypropylene film will now be described with respect to FIGS. 5 and 6. As a result of being linearly stretched at a lower temperature (e.g., at approximately 105° C. as compared to approximately 145° C., etc.), the linearly-stretched polypropylene film 402a shown in FIG. 6 has a smaller lamellar cluster thickness, shorter fibrillar crystals, and a greater quantity of pores of a smaller size as compared to the linearly-stretched polypropylene film 302a shown in FIG. 5. In other words, and specifically, the lamellar clusters 320 of the linearly-stretched polypropylene film 302a of FIG. 5 have a larger cluster thickness as compared to the thickness of the lamellar clusters 420 of the linearly-stretched polypropylene film 402a shown in FIG. 6. Moreover, the fibrillar crystals 322 of the linearly-stretched polypropylene film 302a are longer as compared to the lengths of the fibrillar crystals 422 of the linearly-stretched polypropylene film 402a; and the linearly-stretched polypropylene film 302a has fewer pores 324 that have a larger size as compared to the quantity and size of the pores 424 of the linearly-stretched polypropylene film 402a.

Figure 7:
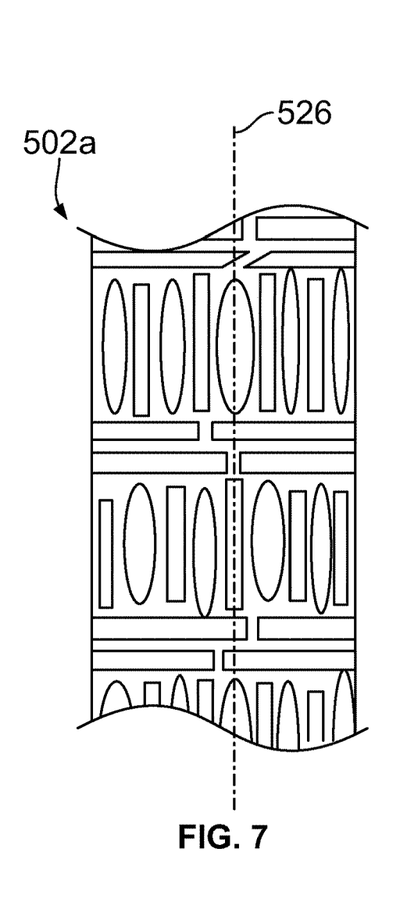
FIG. 7 is an illustration of an example of a microstructure of a linearly-stretched polypropylene film according to an implementation.
Figure 8:
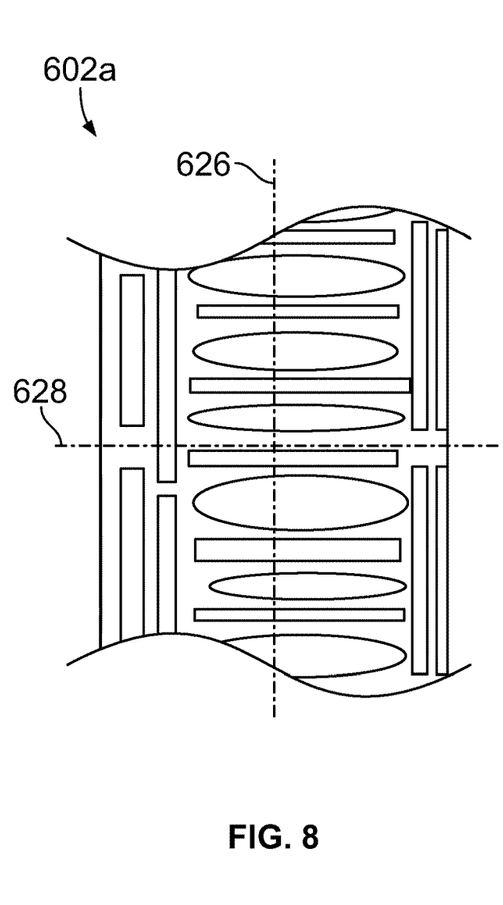
FIG. 8 is an illustration of an example of a microstructure of a linearly-stretched polypropylene film according to an implementation.
Figure 9:
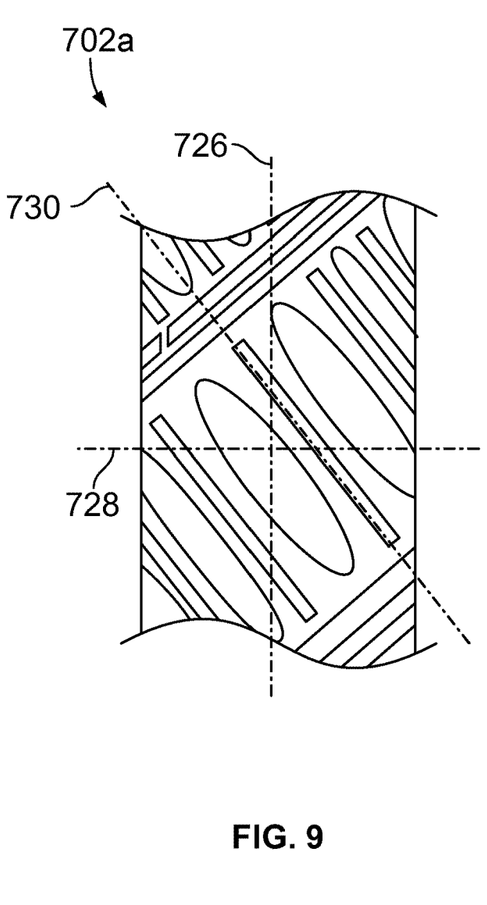
FIG. 9 is an illustration of an example of a microstructure of a linearly-stretched polypropylene film according to an implementation.

As described above, the linearly-stretched polypropylene films disclosed herein are formed by stretching a polypropylene film along only one axis (i.e. along only one direction). The linearly-stretched polypropylene films disclosed herein may be stretched along any axis of (i.e., along any direction relative to) the linearly-stretched polypropylene film. For example, FIG. 7 illustrates a linearly-stretched polypropylene film 502a that has been stretched approximately along a longitudinal axis 526 of the linearly-stretched polypropylene film 502a. In another example, FIG. 8 illustrates a linearly-stretched polypropylene film 602a that has been stretched approximately along a lateral axis 628 of the linearly-stretched polypropylene film 602a that extends approximately perpendicular to a longitudinal axis 626 of the linearly-stretched polypropylene film 602a. FIG. 9 illustrates an example wherein a linearly-stretched polypropylene film 702a has been stretched approximately along an axis 730 that extends oblique to a lateral axis 728 and to a longitudinal axis 726 of the linearly-stretched polypropylene film 702a.

Referring again to FIGS. 1 and 2, although the exemplary implementation of the electrical cable 100 is shown as including one inner conductor 108 that extends concentrically (about the longitudinal axis 104) relative to the outer conductor 110 (such that the exemplary electrical cable 100 is a coaxial cable), the electrical cable 100 may include any number of the inner conductor 108, for example two or more of the inner conductor 108. For example, the electrical cable 100 may have any construction that includes any number of inner conductor 108 surrounded by any number of the outer conductor 110 with any number of dielectric layers (e.g., dielectric layers 102 including linearly-stretched polypropylene films 102a, other dielectric layers and/or sub-layers, etc.) extending radially therebetween. Examples of various constructions of the electrical cable 100 include, but are not limited to, coaxial cables (e.g., the exemplary cable 100 shown herein, etc.), twin-axial cables, cables that include one or more twisted pairs of the inner conductor 108, cables that include two or more cores that each include one or more of the inner conductor 108 surrounded by at least one dielectric layer (e.g., dielectric layers 102 including linearly-stretched polypropylene films 102a, other dielectric layers and/or sub-layers, buffer layers, etc.), and/or the like.

In implementations of the electrical cable 100 that include more than one of the inner conductor 108: at least one discrete linearly-stretched polypropylene film 102a may be applied (e.g., wrapped around, fed over, formed over, etc.) around each inner conductor 108 or each pair of the inner conductor 108; and/or at least one linearly-stretched polypropylene film 102a may extend around all of the inner conductors 108.

Figure 10:
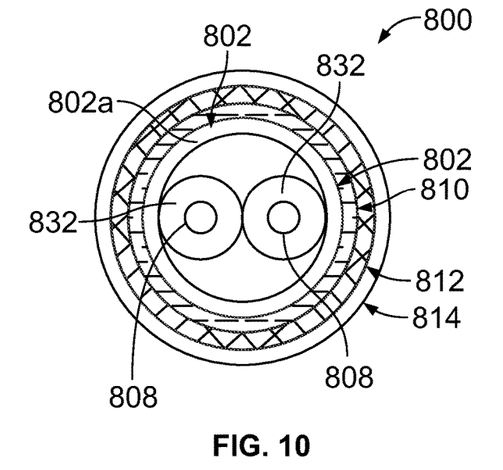
FIG. 10 is a cross-sectional view of an electrical cable according to an implementation.

For example, FIG. 10 illustrates an electrical cable 800 that includes a pair of inner conductors 808, a dielectric layer 802, an outer conductor 810, an outer shield 812, and a jacket 814. Optionally, the pair of inner conductors 808 is a twisted pair. In the exemplary implementation of FIG. 10, each of the inner conductors 808 is surrounded by a discrete insulating layer 832, and the dielectric layer 802 extends around the pair of inner conductors 808. The dielectric layer 802 includes at least one sub-layer of a linearly-stretched polypropylene film 802a. The insulating layers 832 are fabricated from any electrical insulating material, such as, but not limited to, a polyimide, polyester, a thermoplastic, a thermoset plastic, and/or the like. Optionally, one or more of the insulating layers 832 includes a linearly-stretched polypropylene film 802a (e.g., one or more of the insulating layers 832 is a dielectric layer 802, etc.). Each of the insulating layers 832 may be referred to herein as a "first" and/or a "second" dielectric layer.

Figure 11:
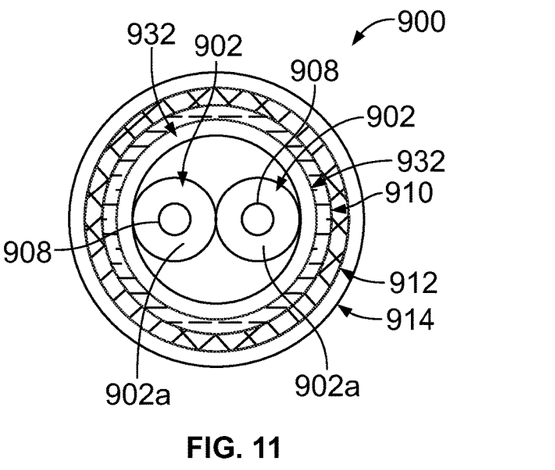
FIG. 11 is a cross-sectional view of an electrical cable according to an implementation.

In another example, FIG. 11 illustrates an electrical cable 900 that includes a pair of inner conductors 908, an electrically insulating layer 932, an outer conductor 910, an outer shield 912, and a jacket 914. Optionally, the pair of inner conductors 908 is a twisted pair. In the exemplary implementation of FIG. 11, each of the inner conductors 908 is surrounded by a discrete dielectric layer 902, and the electrically insulating layer 932 extends around the pair of inner conductors 908. Each of the discrete dielectric layers 902 includes at least one sub-layer of a linearly-stretched polypropylene film 902a. The insulating layer 932 is fabricated from any electrical insulating material, such as, but not limited to, a polyimide, polyester, a thermoplastic, a thermoset plastic, and/or the like. Optionally, the insulating layer 932 includes a linearly-stretched polypropylene film 902a (e.g., the insulating layer 932 is the dielectric layer 902, etc.). Each of the discrete dielectric layers 902 may be referred to herein as a "first" and/or a "second" dielectric layer.

Figure 12:
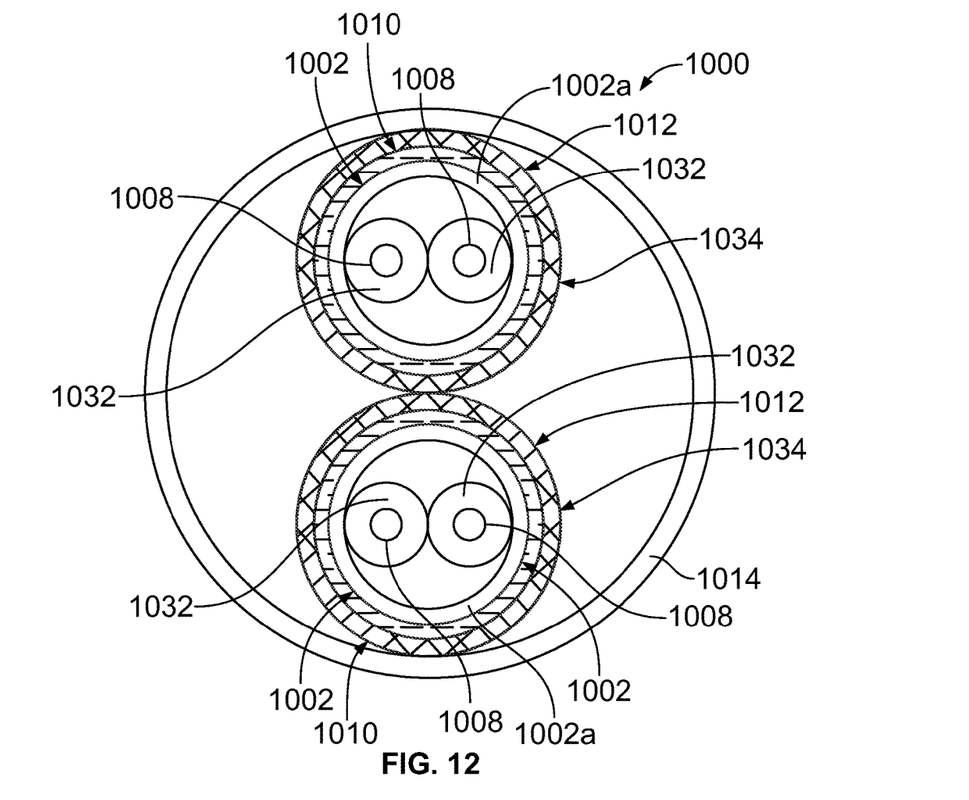
FIG. 12 is a cross-sectional view of an electrical cable according to an implementation.

FIG. 12 illustrates another example wherein an electrical cable 1000 includes two cores 1034 surrounded by a jacket 1014. Each core 1034 includes a pair of inner conductors 1008, a dielectric layer 1002, an outer conductor 1010, and an outer shield 1012. Optionally, one or more of the pairs of inner conductors 1008 is a twisted pair. Within each core 1034, each of the inner conductors 1008 is surrounded by a discrete insulating layer 1032, and the dielectric layer 1002 extends around the pair of inner conductors 1008. The dielectric layer 1002 includes at least one sub-layer of a linearly-stretched polypropylene film 1002a. Discrete insulating layers 1032 are fabricated from any electrical insulating material, such as, but not limited to, a polyimide, polyester, a thermoplastic, a thermoset plastic, and/or the like. Optionally, one or more of the discrete insulating layers 1032 includes a linearly-stretched polypropylene film 1002a. Each of the discrete insulating layers 1032 may be referred to herein as a "first" and/or a "second" dielectric layer.

Referring again to FIGS. 1 and 2, air molecules are trapped within the pores 124 (shown in FIG. 4) of the linearly-stretched polypropylene film 102a such that the linearly-stretched polypropylene film 102a, and thus the dielectric layer 102, includes polypropylene and air (i.e., includes polypropylene and includes air). For example, during fabrication (e.g., manufacture, assembly, construction, etc.) of the electrical cable 100, air molecules from the ambient (e.g., surrounding, local, etc.) environment that are contained within the pores 124 of the linearly-stretched polypropylene film 102a are trapped within the pores 124 as the surrounding layers (e.g., the outer conductor 110, the outer shield 112, the jacket 114, etc.) are applied over the dielectric layer 102. In other words, and for example, air molecules contained within the pores 124 of the linearly-stretched polypropylene film 102a cannot escape from, and are thus trapped within, the pores 124 of the linearly-stretched polypropylene film 102a once one or more of the surrounding layers (e.g., the outer conductor 110, the outer shield 112, the jacket 114, etc.) have been applied over the linearly-stretched polypropylene film 102a.

Various parameters of the linearly-stretched polypropylene film 102a and/or the formation thereof may be selected to: provide the linearly-stretched polypropylene film 102a with a predetermined porosity (e.g., a predetermined volume air that the linearly-stretched polypropylene film 102a is capable of holding, etc.); provide the linearly-stretched polypropylene film 102a with a predetermined dielectric constant $\varepsilon_r$; and/or to provide the electrical cable 100 with a predetermined signal propagation speed (i.e., velocity of signal propagation). Examples of the various parameters of the linearly-stretched polypropylene film 102a and/or the formation thereof that may be selected include, but are not limited to: the number of sub-layers of the linearly-stretched polypropylene film 102a; the arrangement, configuration, manner, geometry, and/or the like of how each sub-layer of the linearly-stretched polypropylene film 102a is applied over the inner conductor 108 (e.g.; axially-wrapped; helically-wrapped; fabricated as a tube, sheath, and/or the like; lay angle; winding direction; overlap of adjacent winding turns; spacing between adjacent winding turns; etc.); the temperature(s) at which a linear stretching operation is performed on a polypropylene film to produce the linearly-stretched polypropylene film 102a; the direction along which a polypropylene film is linearly stretched to produce the linearly-stretched polypropylene film 102a; and/or the like.

For example, one or more various parameters of the linearly-stretched polypropylene film 102a and/or the formation thereof may be selected to increase (e.g., maximize, increase to below a level at which the linearly-stretched polypropylene film 102a loses mechanical structural integrity, etc.) the porosity of the linearly-stretched polypropylene film 102a. In some implementations, the linearly-stretched polypropylene film 102a has a porosity of at least approximately 40%, approximately 50% (i.e., in some implementations the dielectric layer 102 includes at least 50% air), greater than approximately 50%, greater than approximately 60%, and/or the like.

In another example, one or more various parameters of the linearly-stretched polypropylene film 102a and/or the formation thereof is selected to decrease (e.g., minimize, bring as close to 1.0 as possible, etc.) the dielectric constant $\varepsilon_r$ of the linearly-stretched polypropylene film 102a. In some implementations, the linearly-stretched polypropylene film 102a has a dielectric constant $\varepsilon_r$ of less than approximately 1.7, less than approximately 1.4, less than approximately 1.3, and/or the like.

Another example includes selecting one or more various parameters of the linearly-stretched polypropylene film 102a and/or the formation thereof to increase (e.g., maximize, increase to as close to the speed of light as possible, etc.) the signal propagation speed of the electrical cable 100. For example, some implementations of the electrical cable 100 have a signal propagation speed of at least approximately 80% of the speed of light, at least approximately 85% of the speed of light, greater than approximately 90% of the speed of light, and/or the like.

The linearly-stretched polypropylene films disclosed herein (e.g., the linearly-stretched polypropylene films 102a, 202a, 302a, 402a, 502a, 602a, 702a, 802a, 902a, and 1002a shown in FIGS. 1, 2, 4, 3, and 5-12, respectively, etc.) provide dielectric layers that have a greater porosity and therefore a lower dielectric constant $\varepsilon_r$ (e.g., as compared to at least some known dielectric layers, as compared to polyethylene, as compared to polytetrafluoroethylene (PTFE), as compared to an expanded and/or foamed fluoropolymer, etc.), while maintaining the mechanical properties (e.g., the structural integrity, etc.) that enable the dielectric layer to physically space the inner and outer conductors radially apart from each other. The linearly-stretched polypropylene films disclosed herein thus enable the cables disclosed herein (e.g., the electrical cable 100 shown in FIGS. 1 and 2, the electrical cable 200 shown in FIG. 3, the electrical cable 800 shown in FIG. 10, the electrical cable 900 shown in FIG. 11, the electrical cable 1000 shown in FIG. 12, etc.) to achieve greater signal propagation speeds (e.g., exceeding approximately 90% the speed of light, as compared to at least some known electrical cables, etc.) that result in improved signal propagation characteristics (e.g., improved attenuation, as compared to at least some known electrical cables, etc.), while maintaining a relatively high flexibility and less distortion of the signal with bending (e.g., as compared to at least some known electrical cables, etc.).

In some implementations, the linearly-stretched polypropylene films disclosed herein are less compressible across the thickness thereof (e.g., as compared to at least some known dielectric materials, as compared to polyethylene, as compared to ePTFE, as compared to another expanded and/or foamed fluoropolymer, etc.). As compression of a dielectric layer increases the dielectric constant $\varepsilon_r$ of the dielectric layer and thereby lowers the signal propagation speed of the electrical cable, the reduced compressibility of the linearly-stretched polypropylene films disclosed herein may enable the electrical cables disclosed herein to better maintain signal propagation speed during bending and/or flexing of the electrical cable.

In some implementations, the linearly-stretched polypropylene films disclosed herein are thinner (e.g., have a reduced, or smaller, thickness dimension, etc.), for example as compared to at least some known dielectric materials, as compared to polyethylene, as compared to ePTFE, as compared to another expanded and/or foamed fluoropolymer, etc. The reduced thickness of the linearly-stretched polypropylene films disclosed herein may enable the assembly of an electrical cable having a reduced (i.e., smaller) diameter (e.g., a reduced diameter coaxial cable, a reduced diameter microcoaxial cable, etc.). Moreover, the reduced thickness of the linearly-stretched polypropylene films disclosed herein may increase the number of sub-layers of the dielectric layer for an electrical cable having a given impedance, which may result in improved impedance control, for example as compared to a dielectric layer having fewer sub-layers, etc.

The linearly-stretched polypropylene films and the cables disclosed herein provide advantages (e.g., the advantages described above, etc.) over known dielectric materials used in cabling applications. To reduce the dielectric constant $\varepsilon_r$ and thereby increase the signal propagation speeds of electrical cables, different types of polymeric materials have been enhanced with air utilizing different manufacturing processes. Foaming of polyethylene and fluoropolymers (e.g., PTFE, etc.) about the inner conductor(s) has been successful in producing electrical cables with lower dielectric constants $\varepsilon_r$. For example, air-enhanced PTFE films helically wrapped around the inner conductor(s) have yielded dielectric materials with dielectric constants $\varepsilon_r$ of as low as approximately 1.4.

Linearly-stretched polypropylene films are known for use as battery separator material within lithium ion batteries. However, linearly-stretched polypropylene films have a relatively low glass transition temperature (e.g., as compared to at least some known dielectric materials, as compared to polyethylene, as compared to PTFE, as compared to an expanded and/or foamed fluoropolymer, etc.). When a linearly-stretched polypropylene film is heated to or near the glass transition temperature, the film shrinks and at least partially returns to the unstretched form, which has a higher dielectric constant $\varepsilon_r$ and therefore contributes to a lower signal propagation speed of the electrical cable. In other words, linearly-stretched polypropylene films are temperature sensitive such that the porosity of the linearly-stretched polypropylene film decreases as the temperature is elevated at or near the glass transition temperature of the linearly-stretched polypropylene film.

Known methods for constructing electrical cables have focused on other dielectric materials having lower temperature sensitivities, such as PTFE, expanded PTFE (ePTFE), and other expanded and/or foamed fluoropolymers. However, for some cabling applications, the greater porosity, lower dielectric constant $\varepsilon_r$, and resulting increased signal propagation speeds (e.g., as compared to at least some known dielectric layers, as compared to polyethylene, as compared to PTFE, as compared to ePTFE, as compared to an expanded and/or foamed fluoropolymer, etc.) provided by the linearly-stretched polypropylene films disclosed herein provide an unexpected improvement over known dielectric materials used in electrical cables (e.g., polyethylene, PTFE, ePTFE, other expanded and/or foamed fluoropolymers, etc.). For example, the linearly-stretched polypropylene films disclosed herein provide an unexpected improvement over known dielectric materials used in electrical cables in cabling applications wherein the cable (during use, termination, or construction thereof) is not subjected to temperatures at or near the glass transition temperature of the linearly-stretched polypropylene film.

An attempt to mitigate the temperature sensitivity of linearly-stretched polypropylene films, and thereby make a linearly-stretched polypropylene film suitable for use as a dielectric material within an electrical cable, has been made by impregnating the pores of the linearly-stretched polypropylene film with a dielectric liquid. However, impregnating the pores of the linearly-stretched polypropylene film with a dielectric liquid increases the dielectric constant $\varepsilon_r$, of the linearly-stretched polypropylene film.

In some implementations, the linearly-stretched polypropylene films disclosed herein (e.g., the linearly-stretched polypropylene films 102a, 202a, 302a, 402a, 502a, 602a, 702a, 802a, 902a, and 1002a shown in FIGS. 1, 2, 4, 3, and 5-12, respectively, etc.) overcome the temperature sensitivity of linearly-stretched polypropylene films by cross-linking the linearly-stretched polypropylene film. In other words, the linearly-stretched polypropylene film 102a shown in FIGS. 1 and 2 is optionally cross-linked. Cross-linking decreases the temperature sensitivity (i.e., increases the heat resistance) of the linearly-stretched polypropylene film 102a (e.g., increases the glass transition temperature of the linearly-stretched polypropylene film 102a, etc.). Cross-linking of the linearly-stretched polypropylene film 102a thus enables the dielectric layer 102 and thereby the electrical cable 100 to withstand higher temperatures. Accordingly, the cross-linked linearly-stretched polypropylene film 102a is suitable for use in cabling applications wherein the cable 100 (during use, termination, or construction thereof) is subjected to higher temperatures. For example, cross-linking the linearly-stretched polypropylene film 102a may enable the electrical cable 100 to be subjected to a soldering, welding, laser welding, sintering, and/or other heating process (e.g.; for terminating the inner conductor 108 and/or the outer conductor 110 and/or other components of the electrical cable 100 to various components, such as connectors, printed circuit boards, etc.; for extrusion of one or more other components of the cable 100, such as the jacket 114, etc.; for shrinking one or more other components of the cable 100, such as the jacket 114, a strain relief boot, etc.; etc.) without compromising the mechanical structural integrity and/or electrical signal transmission characteristics of the electrical cable 100. Moreover, and for example, cross-linking the linearly-stretched polypropylene film 102a may enable the electrical cable 100 to be used at higher environmental temperatures without compromising the mechanical structural integrity and/or electrical signal transmission characteristics of the electrical cable 100.

The linearly-stretched polypropylene films disclosed herein may be cross-linked using any suitable method, process, structure, machine, means, and/or the like, such as, but not limited to, electron beam technology, chemical cross-linking, and/or the like.

The outer conductor 110 is optional. In other words, some implementations of the electrical cable 100 do not include the outer conductor 110. The outer conductor 110 is electrically conductive and may be fabricated from any materials that enable the outer conductor 110 to function as described and/or illustrated herein, such as, but not limited to, silver-plated copper, silver-plated copper-clad steel, stainless steel, an aluminized polyimide or polyester tape, carbon fiber, and/or the like. In the exemplary implementation, the outer conductor 110 is an approximately planar strip having a rectangular cross sectional shape. In addition or alternatively, the outer conductor 110 may have any other shape, such as, but not limited to, a cylindrical shape and/or the like.

The outer conductor 110 may be applied around the dielectric layer 102 in any arrangement, configuration, manner, with any geometry, and/or the like that enables the outer conductor 110 to function as described and/or illustrated herein. For example, the outer conductor 110 may be: axially-wrapped around the dielectric layer 102; helically-wrapped around the dielectric layer 102; fabricated as a tube, sheath, and/or the like (e.g., via extrusion, etc.); and/or the like. When wrapped around the dielectric layer 102, the winding turns of a sub-layer of the outer conductor 110 may have any lay angle, any winding direction, any amount of overlap of adjacent winding turns, any amount of spacing between adjacent winding turns, and/or the like that enables the outer conductor 110 to function as described and/or illustrated herein. In the exemplary implementation shown in FIGS. 1 and 2, the outer conductor 110 is helically-wrapped around the dielectric layer 102 (as shown in FIG. 1).

The outer shield 112 is configured to restrain the outer conductor 110 and/or provide mechanical axial strength to the electrical cable 100. In some implementations, the outer shield 112 includes a plurality of wires and/or strands that are braided and/or served together. The outer shield 112 is electrically conductive in some implementations, for example to provide electrical shielding of the inner conductor 108 and/or the outer conductor 110. Exemplary materials for the outer shield 112 include, but are not limited to, silver-plated copper, silver-plated copper-clad steel, stainless steel, carbon fiber, and/or the like. In some implementations, the outer shield 112 performs one or more functions of the outer conductor 110 (e.g., the outer shield 112 replaces the outer conductor 110 such that the electrical cable 100 does not include the outer conductor 110, etc.), or vice versa.

The jacket 114 is optionally fabricated from an electrically insulating material. In addition or alternatively, the jacket 114 may be fabricated from an electrically conductive material, for example to provide shielding and/or electrical isolation. The jacket 114 is optionally fabricated from a material that facilitates protecting the internal structure of the electrical cable 100 from environmental threats such as, but not limited to, dirt, debris, heat, cold, fluids, impact damage, and/or the like. Suitable electrically insulating materials for the jacket 114 include, but are not limited to, a polyimide, polyester, a thermoplastic, a thermoset plastic, and/or the like.

Figure 13:
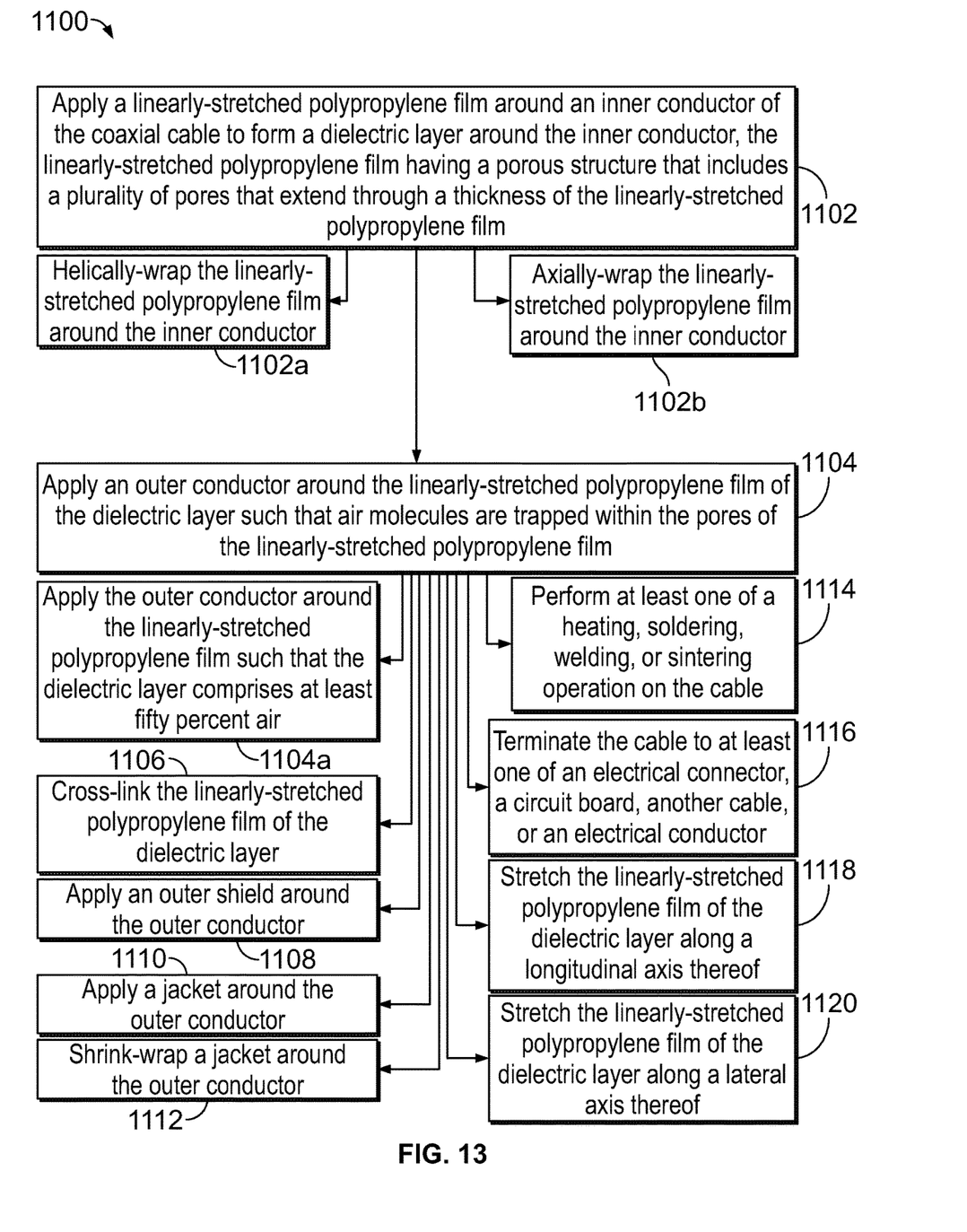
FIG. 13 is a flow chart illustrating a method for assembling a coaxial cable according to an implementation.

FIG. 13 illustrates a method 1100 for assembling a coaxial cable (e.g., the electrical cable 100 shown in FIGS. 1 and 2, the electrical cable 200 shown in FIG. 3, the electrical cable 800 shown in FIG. 10, the electrical cable 900 shown in FIG. 11, the electrical cable 1000 shown in FIG. 12, etc.). The method 1100 includes applying, at 1102, a linearly-stretched polypropylene film (e.g., the linearly-stretched polypropylene films 102a, 202a, 302a, 402a, 502a, 602a, 702a, 802a, 902a, and 1002a shown in FIGS. 1, 2, 4, 3, and 5-12, respectively, etc.) around an inner conductor of the coaxial cable to form a dielectric layer around the inner conductor, the linearly-stretched polypropylene film having a porous structure that includes a plurality of pores that extend through a thickness of the linearly-stretched polypropylene film. At 1104, the method 1100 includes applying an outer conductor around the linearly-stretched polypropylene film of the dielectric layer such that air molecules are trapped within the pores of the linearly-stretched polypropylene film.

Optionally, the method 1100 further includes cross-linking, at 1106, the linearly-stretched polypropylene film of the dielectric layer. In some implementations, the method 1100 further includes applying, at 1108, an outer shield around the outer conductor. The method 1100 optionally further includes applying, at 1110, a jacket around the outer conductor. Optionally, the method 1100 further includes shrinking-wrapping, at 1112, a jacket around the outer conductor. In some implementations, the method 1100 further includes performing, at 1114, at least one of a heating, soldering, welding, or sintering operation on the cable. Some implementations of the method 1100 further include terminating, at 1116, the cable to at least one of an electrical connector, a circuit board, another cable, or an electrical conductor. Optionally, the method 1100 further includes stretching, at 1118, the linearly-stretched polypropylene film of the dielectric layer along a longitudinal axis of the linearly-stretched polypropylene film. In some implementations, the method 1100 further includes stretching, at 1120, the linearly-stretched polypropylene film of the dielectric layer along a lateral axis of the linearly-stretched polypropylene film.

In some implementations, applying at 1102 the linearly-stretched polypropylene film around the inner conductor includes helically-wrapping, at 1102a, the linearly-stretched polypropylene film around the inner conductor. Optionally, applying at 1102 the linearly-stretched polypropylene film around the inner conductor includes axially-wrapping, at 1102b, the linearly-stretched polypropylene film around the inner conductor.

In some implementations, applying at 1104 the outer conductor around the linearly-stretched polypropylene film of the dielectric layer includes applying, at 1104a, the outer conductor around the linearly-stretched polypropylene film such that the dielectric layer comprises at least fifty percent air.

The following clauses describe further aspects:

Clause Set A

A1. A cable comprising:
an inner conductor;
a dielectric layer extending around the inner conductor, the dielectric layer comprising a linearly-stretched polypropylene film having a porous structure that includes a plurality of pores that extend through a thickness of the linearly-stretched polypropylene film, the dielectric layer comprising air molecules trapped within the pores of the linearly-stretched polypropylene film such that the dielectric layer comprises polypropylene and air; and
an outer conductor extending around the dielectric layer.

A2. The cable of any preceding clause, wherein the linearly-stretched polypropylene film of the dielectric layer is cross-linked.

A3. The cable of any preceding clause, wherein the linearly-stretched polypropylene film of the dielectric layer has been stretched along a longitudinal axis of the linearly-stretched polypropylene film.

A4. The cable of any preceding clause, wherein the linearly-stretched polypropylene film of the dielectric layer has been stretched along a lateral axis of the linearly-stretched polypropylene film.

A5. The cable of any preceding clause, wherein the dielectric layer comprises at least fifty percent air.

A6. The cable of any preceding clause, wherein the dielectric layer comprises a dielectric constant of less than approximately 1.7.

A7. The cable of any preceding clause, wherein the dielectric layer comprises a dielectric constant of less than approximately 1.4.

A8. The cable of any preceding clause, further comprising an outer shield extending around the outer conductor.

A9. The cable of any preceding clause, further comprising a jacket extending around the outer conductor.

A10. The cable of any preceding clause, wherein the linearly-stretched polypropylene film of the dielectric layer is helically-wrapped around the inner conductor.

A11. The cable of any preceding clause, wherein the linearly-stretched polypropylene film of the dielectric layer is axially-wrapped around the inner conductor.

A12. The cable of any preceding clause, wherein the inner conductor comprises first and second inner conductors, the dielectric layer comprising a first dielectric layer extending around the first inner conductor and a second dielectric layer extending around the second inner conductor.

A13. The cable of any preceding clause, wherein the inner conductor is coaxially aligned with the outer conductor such that the cable is a coaxial cable.

Clause Set B

B1. A cable comprising:
at least one inner conductor;
a dielectric layer extending around the at least one inner conductor, the dielectric layer comprising a linearly-stretched polypropylene film having a porous structure that includes a plurality of pores that extend through a thickness of the linearly-stretched polypropylene film, the dielectric layer comprising air molecules trapped within the pores of the linearly-stretched polypropylene film such that the dielectric layer comprises polypropylene and air, the linearly-stretched polypropylene film being cross-linked;
an outer conductor extending around the dielectric layer; and
a jacket extending around the outer conductor.

B2. The cable of any preceding clause, wherein the dielectric layer comprises at least fifty percent air.

B3. The cable of any preceding clause, wherein the dielectric layer comprises a dielectric constant of less than approximately 1.7.

B4. The cable of any preceding clause, wherein the dielectric layer comprises a dielectric constant of less than approximately 1.4.

B5. The cable of any preceding clause, further comprising an outer shield extending around the outer conductor, the jacket extending around the outer shield.

B6. The cable of any preceding clause, wherein the linearly-stretched polypropylene film of the dielectric layer has been stretched along a longitudinal axis of the linearly-stretched polypropylene film.

B7. The cable of any preceding clause, wherein the linearly-stretched polypropylene film of the dielectric layer has been stretched along a lateral axis of the linearly-stretched polypropylene film.

B8. The cable of any preceding clause, wherein the linearly-stretched polypropylene film of the dielectric layer is helically-wrapped around the inner conductor.

B9. The cable of any preceding clause, wherein the linearly-stretched polypropylene film of the dielectric layer is axially-wrapped around the inner conductor.

B10. The cable of any preceding clause, wherein the inner conductor comprises first and second inner conductors, the dielectric layer comprising a first dielectric layer extending around the first inner conductor and a second dielectric layer extending around the second inner conductor.

B11. The cable of any preceding clause, wherein the inner conductor is coaxially aligned with the outer conductor such that the cable is a coaxial cable.

Clause Set C

C1. A method for assembling a coaxial cable, the method comprising:
applying a linearly-stretched polypropylene film around an inner conductor of the coaxial cable to form a dielectric layer around the inner conductor, the linearly-stretched polypropylene film having a porous structure that includes a plurality of pores that extend through a thickness of the linearly-stretched polypropylene film; and
applying an outer conductor around the linearly-stretched polypropylene film of the dielectric layer such that air molecules are trapped within the pores of the linearly-stretched polypropylene film.

C2. The method of any preceding clause, further comprising cross-linking the linearly-stretched polypropylene film of the dielectric layer.

C3. The method of any preceding clause, wherein applying the outer conductor around the linearly-stretched polypropylene film of the dielectric layer comprises applying the outer conductor around the linearly-stretched polypropylene film such that the dielectric layer comprises at least fifty percent air.

C4. The method of any preceding clause, further comprising performing at least one of a heating, soldering, welding, or sintering operation on the coaxial cable.

C5. The method of any preceding clause, further comprising terminating the coaxial cable to at least one of an electrical connector, a circuit board, another cable, or an electrical conductor.

C6. The method of any preceding clause, further comprising shrinking-wrapping a jacket around the outer conductor.

C7. The method of any preceding clause, wherein applying the linearly-stretched polypropylene film around the inner conductor comprises helically-wrapping the linearly-stretched polypropylene film around the inner conductor.

C8. The method of any preceding clause, wherein applying the linearly-stretched polypropylene film around the inner conductor comprises axially-wrapping the linearly-stretched polypropylene film around the inner conductor.

C9. The method of any preceding clause, further comprising applying an outer shield around the outer conductor.

C10. The method of any preceding clause, further comprising applying a jacket around the outer conductor.

C11. The method of any preceding clause, further comprising stretching the linearly-stretched polypropylene film of the dielectric layer along a longitudinal axis of the linearly-stretched polypropylene film.

C12. The method of any preceding clause, further comprising stretching the linearly-stretched polypropylene film of the dielectric layer along a lateral axis of the linearly-stretched polypropylene film.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one implementation or can relate to several implementations. The implementations are not limited to those that solve any or all of the stated problems or those that have any or all of the stated benefits and advantages. It will further be understood that reference to 'an' item refers to one or more of those items.

The order of execution or performance of the operations in examples of the present application illustrated and described herein is not essential, unless otherwise specified. That is, the operations can be performed in any order, unless otherwise specified, and examples of the application can include additional or fewer operations than those disclosed herein. For example, it is contemplated that executing or performing a particular operation before, contemporaneously with, or after another operation (e.g., different steps, etc.) is within the scope of aspects and implementations of the application.

The term "comprising" is used in this specification to mean including the feature(s) or act(s) followed thereafter, without excluding the presence of one or more additional features or acts. The terms "comprising," "including," and "having" are intended to be inclusive and mean that there can be additional elements other than the listed elements. In other words, the use of "including," "comprising," "having," "containing," "involving," and variations thereof, is meant to encompass the items listed thereafter and additional items. Accordingly, and for example, unless explicitly stated to the contrary, implementations "comprising" or "having" an element or a plurality of elements having a particular property can include additional elements not having that property. Further, references to "one implementation" or "an implementation" are not intended to be interpreted as excluding the existence of additional implementations that also incorporate the recited features. The term "exemplary" is intended to mean "an example of".

When introducing elements of aspects of the application or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one." Accordingly, and for example, as used herein, an element or step recited in the singular and preceded by the word "a" or "an" should be understood as not necessarily excluding the plural of the elements or steps.

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the application in detail, it will be apparent that modifications and variations are possible without departing from the scope of aspects of the application as defined in the appended claims. As various changes could be made in the above constructions, products, and methods without departing from the scope of aspects of the application, it is intended that all matter contained in the above description and shown in the accompanying drawings shall be interpreted as illustrative and not in a limiting sense.

It is to be understood that the above description is intended to be illustrative, and not restrictive. For example, the above-described implementations (and/or aspects thereof) can be used in combination with each other. In addition, many modifications can be made to adapt a particular situation or material to the teachings of the various implementations of the application without departing from their scope. While the dimensions and types of materials described herein are intended to define the parameters of the various implementations of the application, the implementations are by no means limiting and are example implementations. Many other implementations will be apparent to those of ordinary skill in the art upon reviewing the above description. The scope of the various implementations of the application should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the application, including the best mode, and also to enable any person of ordinary skill in the art to practice the various implementations of the application, including making and using any devices or systems and performing any incorporated methods. The patentable scope of the various implementations of the application is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A cable comprising:
an inner conductor;
a dielectric layer extending around the inner conductor, the dielectric layer comprising a linearly-stretched polypropylene film having a porous structure that includes a plurality of pores that extend through a thickness of the linearly-stretched polypropylene film, the dielectric layer comprising air molecules trapped within the pores of the linearly-stretched polypropylene film such that the dielectric layer comprises polypropylene and air; and
an outer conductor extending around the dielectric layer.

2. The cable of claim 1, wherein the linearly-stretched polypropylene film of the dielectric layer is cross-linked.

3. The cable of claim 1, wherein the linearly-stretched polypropylene film of the dielectric layer has been stretched along a longitudinal axis of the linearly-stretched polypropylene film.

4. The cable of claim 1, wherein the linearly-stretched polypropylene film of the dielectric layer has been stretched along a lateral axis of the linearly-stretched polypropylene film.

5. The cable of claim 1, wherein the dielectric layer comprises at least fifty percent air.

6. The cable of claim 1, wherein the dielectric layer comprises a dielectric constant of less than approximately 1.7.

7. The cable of claim 1, wherein the dielectric layer comprises a dielectric constant of less than approximately 1.4.

8. The cable of claim 1, further comprising an outer shield extending around the outer conductor.

9. The cable of claim 1, further comprising a jacket extending around the outer conductor.

10. The cable of claim 1, wherein the linearly-stretched polypropylene film of the dielectric layer is helically-wrapped around the inner conductor.

11. The cable of claim 1, wherein the linearly-stretched polypropylene film of the dielectric layer is axially-wrapped around the inner conductor.

12. The cable of claim 1, wherein the inner conductor comprises first and second inner conductors, the dielectric layer comprising a first dielectric layer extending around the first inner conductor and a second dielectric layer extending around the second inner conductor.

13. The cable of claim 1, wherein the inner conductor is coaxially aligned with the outer conductor such that the cable is a coaxial cable.

14. A cable comprising:
at least one inner conductor;
a dielectric layer extending around the at least one inner conductor, the dielectric layer comprising a linearly-stretched polypropylene film having a porous structure that includes a plurality of pores that extend through a thickness of the linearly-stretched polypropylene film, the dielectric layer comprising air molecules trapped within the pores of the linearly-stretched polypropylene film such that the dielectric layer comprises polypropylene and air, the linearly-stretched polypropylene film being cross-linked;
an outer conductor extending around the dielectric layer; and
a jacket extending around the outer conductor.

15. The cable of claim 14, wherein the dielectric layer comprises at least one of at least fifty percent air or a dielectric constant of less than approximately 1.7.

16. The cable of claim 14, wherein the linearly-stretched polypropylene film of the dielectric layer has been stretched along at least one of a longitudinal axis of the linearly-stretched polypropylene film or a lateral axis of the linearly-stretched polypropylene film.

17. A method for assembling a coaxial cable, the method comprising:
applying a linearly-stretched polypropylene film around an inner conductor of the coaxial cable to form a dielectric layer around the inner conductor, the linearly-stretched polypropylene film having a porous structure that includes a plurality of pores that extend through a thickness of the linearly-stretched polypropylene film; and
applying an outer conductor around the linearly-stretched polypropylene film of the dielectric layer such that air molecules are trapped within the pores of the linearly-stretched polypropylene film.

18. The method of claim 17, further comprising cross-linking the linearly-stretched polypropylene film of the dielectric layer.

19. The method of claim 17, further comprising performing at least one of a heating, soldering, welding, or sintering operation on the coaxial cable.

20. The method of claim 17, further comprising terminating the coaxial cable to at least one of an electrical connector, a circuit board, another cable, or an electrical conductor.

* * * * *